US009022649B2

(12) United States Patent
Lewis et al.

(10) Patent No.: US 9,022,649 B2
(45) Date of Patent: May 5, 2015

(54) FLUORESCENCE BASED THERMOMETRY

(71) Applicant: Research Triangle Institute, International, Research Triangle Park, NC (US)

(72) Inventors: John Lewis, Durham, NC (US); Ethan Klem, Durham, NC (US); Jeffrey Robert Piascik, Raleigh, NC (US); Garry Brian Cunningham, Fuquay Varina, NC (US)

(73) Assignee: Research Triangle Institute, Durham, NC (US)

( * ) Notice: Subject to any disclaimer, the term of this patent is extended or adjusted under 35 U.S.C. 154(b) by 0 days.

(21) Appl. No.: 13/645,765

(22) Filed: Oct. 5, 2012

(65) Prior Publication Data
US 2013/0034122 A1    Feb. 7, 2013

Related U.S. Application Data

(63) Continuation of application No. PCT/US2011/031533, filed on Apr. 7, 2011.

(60) Provisional application No. 61/321,579, filed on Apr. 7, 2010.

(51) Int. Cl.
*G01K 11/00* (2006.01)
*G01K 11/32* (2006.01)

(52) U.S. Cl.
CPC ................ *G01K 11/3213* (2013.01)

(58) Field of Classification Search
CPC ........... G01J 5/08; G01J 5/0003; G01J 5/041; G01J 5/60; G01J 5/0022; G01J 5/02; G01J 5/04; G01J 5/06; G01K 13/08; G01K 1/16; G01K 13/06; G01K 11/3213; G01K 11/32
USPC .......... 374/120–121, 130–131, 161; 436/172; 536/26.6
See application file for complete search history.

(56) References Cited

U.S. PATENT DOCUMENTS 4,075,493 A * 2/1978 Wickersheim ............... 374/159
4,885,633 A   12/1989 Buck
(Continued)

OTHER PUBLICATIONS

Pacific Silicon Sensors Inc, "Wavelength Sensor WS-7.56-TO5, Data Sheet", Jan. 31, 2005.*
(Continued)

*Primary Examiner* — Lisa Caputo
*Assistant Examiner* — Nasir U Ahmed
(74) *Attorney, Agent, or Firm* — Olive Law Group, PLLC

(57) ABSTRACT

A temperature sensor includes a photon source, a fluorescent element and a photodetector. The fluorescent element includes a temperature-insensitive first fluorophore and a temperature-sensitive second fluorophore. The photodetector includes a first photosensor exhibiting a first spectral responsivity and a second photosensor exhibiting a second spectral responsivity. To measure a temperature of a surface, the fluorescent element may be placed adjacent to the surface and irradiated with a photon beam. First photons emitted from the first fluorophore and second photons emitted from the second fluorophore are collected. The first and second photons may be transmitted as a single dichromatic beam to the photodetector. The photosensors generate two different photodetector output signals, the ratio of which may be correlated to temperature.

34 Claims, 8 Drawing Sheets

(56) References Cited

U.S. PATENT DOCUMENTS 6,132,958 A * 10/2000 Simon .............................. 435/4
2006/0140248 A1* 6/2006 Gotthold et al. .............. 374/161

OTHER PUBLICATIONS

Mosharov et al. "Temperature sensitive paint (TSP) for heat transfer measurement in short duration wind tunnels"; Instrumentation in Aerospace Simulation Facilities, 2003. ICIASF '03. 20th International Congress; Goettingen Germany; Aug. 25-29, 2003, IEEE 2003; pp. 351-357.*

Notification of Transmittal of the International Search Report and the Written Opinion of the International Searching Authority, or the Declaration dated Dec. 22, 2011.

Pacific Silicon Sensor Incorporated; Data Sheet; WS-7.56-TO5; Wavelength Sensor WS-7.56-TO5; Jun. 14, 2008; pp. 1-2.

Ross, et al.; Fluorescence Thermometry in Microfluidics; American Institute of Physics Conference Proceedings; vol. 684, Jan. 1, 2003; pp. 1051-1056.

Kim, et al.; Dual-Trader Fluorescence Thermometry Measurements in a Heated Channel; Experiments in Fluids; Experimental Methods and Their Applications to Fluid Flow; Springer, Berlin, Germany; vol. 49, No. 1, Mar. 13, 2010; pp. 257-266.

Natrajan, et al.; Two-Color Laser-Induced Fluorescent Thermometry for Microfluidic Systems; Measurement Science and Technology; Bristol, United Kingdom; vol. 20, No. 1; Jan. 1, 2009; p. 15401 (11pp).

Mosharov, et al.; Temperature Sensitive Paint (TSP) for Heat Transfer Measurement in Short Duration Wind Tunnels; ICIASF '03 Record 20th International Congress on Instrumentation in Aerospace Simulation Facilities; Goettingen, Germany; Aug. 25-29, 2003; IEEE 2003; pp. 351-357.

* cited by examiner

FLUORESCENCE BASED THERMOMETRY

RELATED APPLICATION

This application is a continuation of International Application No. PCT/US11/31533 filed Apr. 7, 2011, titled "FLUORESCENCE BASED THERMOMETRY", which claims the benefit of U.S. Provisional Patent Application Ser. No. 61/321,579, filed Apr. 7, 2010, titled "FLUORESCENCE BASED THERMOMETRY", the contents of which are incorporated by reference herein in their entireties.

STATEMENT REGARDING FEDERALLY SPONSORED RESEARCH OR DEVELOPMENT

This invention was made at least in part with government support under Grant No. W900KK-08-C-0043 awarded by the United States Department of Defense, United States Army Program Executive Office for Simulation, Training and Instrumentation (U.S. Army PEO STRI). The United States Government may have certain rights in the invention.

TECHNICAL FIELD

The present invention relates to fluorescence-based thermometry.

BACKGROUND

A fluorescent material emits light of a certain wavelength in response to absorbing light of a different (and typically shorter) wavelength. Fluorescence thermometry may be utilized to measure the temperature of fluorescent materials, and indirectly measure a second material in contact with the fluorescent material, by taking advantage of the temperature-dependent fluorescent behavior of certain materials. Generally, some characteristic of fluorescence (intensity, decay time, wavelength) is correlated with temperature. As an optics-based technique, fluorescence thermometry lends itself to the use of optical waveguides, particularly elongated waveguides such as optical fibers, light pipes, and the like. Thus, active components utilized in fluorescence thermometry (excitation source, optical sensor, electronics) can be placed remotely from the surface to be measured. Accordingly, the temperature measurement can take place in an environment unsuitable for these active components, such as in the presence of high temperatures, harsh chemicals, or electromagnetic fields.

Several approaches have been developed for implementing fluorescence thermometry. The most successful approach to date entails correlating fluorescence decay time with temperature. This approach overcomes problems with accuracy and stability, but requires sophisticated and costly components, including a modulated light source and suitable electronics to extract fluorescence decay time. By measuring decay, where lower signal levels contribute to the measurement, noise can be a considerable factor. Also, because it is a decay process where many cycles must be averaged to determine a decay time, response time is typically limited to about 0.25 seconds or more.

An alternative approach to optical thermometry involves measuring the ratio of emission between two fluorescent materials, such that the ratio is correlated with temperature. These approaches are optically inefficient. One example is the use of separate fibers or a split fiber, together with separate optical sensors and optical filters. In such an approach each optical sensor receives less than half of the photons generated by the fluorescence process. Another example is the use of a grating to distinguish wavelengths, which is even more optically inefficient due to the spatial dispersion of light.

There is an ongoing need for fluorescence-based thermometric apparatus and methods that are more optically efficient, accurate, reliable, and able to respond quickly. There is also a need for fluorescence-based thermometric apparatus and methods that are operable in adverse environments.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a temperature sensor includes a photon source, a fluorescent element communicating with the photon source, and a photodetector communicating with the fluorescent element. The fluorescent element includes a first fluorophore and a second fluorophore, wherein the first fluorophore is substantially temperature insensitive and the second fluorophore is temperature sensitive. The first fluorophore and the second fluorophore are configured for emitting respective optical signal outputs in response to receiving an incident optical signal input from the photon source. The photodetector includes a first photosensor exhibiting a first spectral responsivity and a second photosensor exhibiting a second spectral responsivity.

In some implementations, the first fluorophore is selected to optimize the first spectral responsivity and the second fluorophore is selected to optimize the second spectral responsivity.

In some implementations, the first photosensor and the second photosensor are disposed in a vertically integrated arrangement. The photodetector may be configured to receive a single incident optical input from the fluorescent element that includes the respective optical signal outputs and, in response, produce a first electrical detector signal output and a second electrical detector signal output having a ratio that varies proportionally to the optical signal outputs.

In some implementations, the first photosensor is configured to absorb a first spectral portion of the optical input to produce the first electrical detector signal output, and the second photosensor is configured to absorb a spectral portion of the optical input that passes through the first photosensor to produce the second electrical detector signal output.

According to another implementation, a method for measuring a temperature of a surface includes irradiating a fluorescent element adjacent to the surface with a photon beam. The fluorescent element includes a first fluorophore that is substantially temperature insensitive and a second fluorophore that is temperature sensitive. The method also includes collecting first photons emitted from the first fluorophore and second photons emitted from the second fluorophore. The first photons have a first wavelength. The second photons have a second wavelength different from the first wavelength and an intensity dependent on the temperature of the surface. The first photons and the second photons are transmitted as a single dichromatic beam to a photodetector.

According to another implementation, the photodetector includes two photosensors having different respective spectral responsivities such that the two photosensors generate two different electrical output signals in response to transmitting the single dichromatic beam. A ratio of the two output signals may be correlated to the temperature of the surface.

In some implementations, the first photosensor and the second photosensor may be disposed in stacked arrangement.

In some implementations, the photosensors may be fabricated such that light that is not absorbed by the first photosensor passes through that photosensor directly into the second photosensor, such that the dichromatic beam does not need to be separated into separate beams. A first electrical output signal may be produced in response to the first photosensor absorbing first photons, and a second electrical output signal may be produced in response to the second photosensor absorbing second photons that have passed through the first photosensor. Alternatively the photodetector may be constructed so that light may pass through the second photosensor into the first photosensor.

According to another implementation, a temperature measurement probe includes a fluorescent element, an optical beam turner communicating with the fluorescent element, an optical excitation waveguide including a first distal portion communicating with the optical beam turner, and an optical collection waveguide including a second distal portion communicating with the optical beam turner. The first distal portion and the second distal portion are oriented along a direction parallel with the fluorescent element. The temperature measurement probe provides an optical excitation path and an optical collection path. The optical excitation path runs through the optical excitation waveguide along the parallel direction, through the optical beam turner in which the optical excitation is path is turned to a direction normal to the fluorescent element, and to the fluorescent element along the normal direction. The optical collection path runs from the fluorescent element along the normal direction, through the optical beam turner in which the optical collection path is turned to the parallel direction, and through the optical collection waveguide along the parallel direction.

According to another implementation, a fluorescent article includes a polymer matrix and a dye blend supported by the polymer matrix. The dye blend includes a stable blue emitting material and ruthenium(II) tris(2,2'-bipyridyl).

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

For purposes of the present disclosure, it will be understood that when a layer (or film, region, substrate, component, device, or the like) is referred to as being "on" or "over" another layer, that layer may be directly or actually on (or over) the other layer or, alternatively, intervening layers (e.g., buffer layers, transition layers, interlayers, sacrificial layers, etch-stop layers, masks, electrodes, interconnects, contacts, or the like) may also be present. A layer that is "directly on" another layer means that no intervening layer is present, unless otherwise indicated. It will also be understood that when a layer is referred to as being "on" (or "over") another layer, that layer may cover the entire surface of the other layer or only a portion of the other layer. It will be further understood that terms such as "formed on" or "disposed on" are not intended to introduce any limitations relating to particular methods of material transport, deposition, fabrication, surface treatment, or physical, chemical, or ionic bonding or interaction. The term "interposed" is interpreted in a similar manner.

Figure 1:
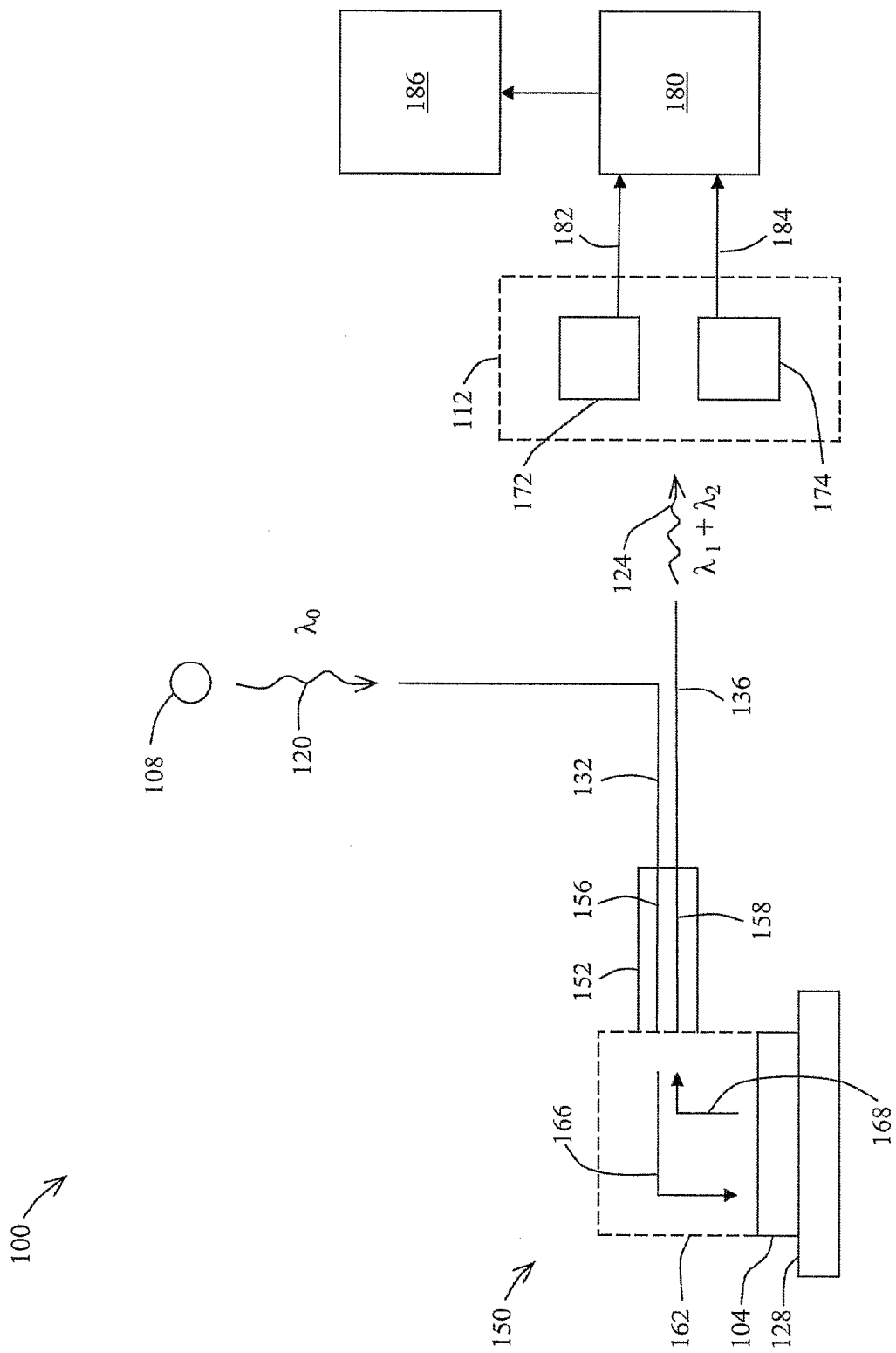
FIG. 1 is a diagram providing an overview of an example of a temperature sensor according to certain implementations of the present disclosure.

FIG. 1 is a diagram providing an overview of an example of a temperature sensor 100 (e.g., a temperature measurement apparatus, system, etc.) according to certain implementations of the present disclosure. The temperature sensor 100 generally includes a fluorescent element 104 (article, component, layer, coating, film, etc.), an excitation photon source 108, a photodetector 112, and optics for transmitting optical excitation signals 120 from the photon source 108 to the fluorescent element 104 and optical measurement signals 124 from the fluorescent element 104 to the photodetector 112. In practice, the fluorescent element 104 may be placed in contact with a surface 128 of interest, i.e., a surface for which temperature is to be measured. Any surface 128 found to be compatible with the temperature sensor 100 may be measured, such as the surface of a mechanical structure, the surface of a liquid, human skin, etc. The fluorescent element 104 may be fixed in juxtaposition with the surface 128 by any means ensuring that heat from the surface 128 is readily transferred to the fluorescent element 104 such that the temperature of the fluorescent element 104 accurately represents the temperature of the surface 128 being measured. The fluorescent element 104 may be very thin, e.g. 100 nm-100 μm to decrease the response time of the fluorescent element 104 to a change in temperature of the surface 128. The fluorescent element 104 may have a planar or curved shape as needed to conform to the shape of the area of the surface 128 for which temperature is to be measured. The optics may include an optical excitation waveguide 132 and an optical collection waveguide 136. For situations in which the surface 128 is located in a harsh environment, the optical waveguides 132, 136 may be provided as elongated structures of lengths sufficient to enable the photon source 108, the photodetector 112 and associated hardware to be located (situated, mounted, etc.) remotely (and isolated from) the harsh environment. As a typical example, the optical waveguides 132, 136 may be optical fibers of a type appropriate for implementations described herein.

The photon source 108 may be any source of electromagnetic radiation capable of emitting a beam 120 of photons at a wavelength $\lambda_0$ suitable for exciting fluorescence in the fluorescent element 104. Examples of the photon source 108 include but are not limited to a light-emitting diode (LED), a laser diode (LD), a laser, and various light sources conventionally utilized in optics-related fields of spectroscopy and spectrophotometry. The photon source 108 may be configured to produce a beam 120 of photons on a continuous basis. That is, the photon beam 120, when active, need not be pulsed or modulated.

The optical excitation waveguide 132 includes a proximal (input) end and a distal (output) end. The optical collection waveguide 136 includes a proximal (output) end and a distal (input) end. The proximal and distal ends of the optical excitation waveguide 132 may be interfaced with (and optically coupled to) the photon source 108 and the fluorescent element 104, respectively, in any suitable and efficient (minimal loss) manner. The proximal and distal ends of the optical collection waveguide 136 may likewise be interfaced with (and optically coupled to) the photodetector 112 and the fluorescent element 104, respectively, in any suitable and efficient (minimal loss) manner. Structurally, in some implementations the temperature sensor 100 may be considered as including a temperature measurement probe 150 (or probe assembly). When the optical waveguides 132, 136 are provided in elongated forms such as optical fibers, the temperature measurement probe 150 may be considered as being located remotely from the photon source 108 and the photodetector 112. Depending on design, the fluorescent element 104 may be attached, applied to, or form a part of the temperature measurement probe 150, and the distal ends of the optical waveguides 132, 136 may be coupled to the temperature measurement probe 150 in any suitable manner. As an example, the probe 150 may include a ferrule or housing 152 enclosing respective distal portions 156, 158 of the optical waveguides 132, 136.

The probe 150 may also include any optics 162 (and an associated enclosure of the optics, if desired) that might be interposed between the distal ends of the optical waveguides 132, 136 and the fluorescent element 104. For example, as illustrated in FIG. 1 the probe 150 may be configured so as to have a low profile. In the low-profile implementation, at least the distal portions 156, 158 of the optical waveguides 132, 136 (and thus the optical excitation and collection paths) may be oriented along a direction parallel with the surface 128 and/or the fluorescent element 104. This configuration minimizes the height to which the probe 150 extends outward from the surface 128. For this purpose, the probe 150 may include as optics 162 a beam turner (not specifically shown in FIG. 1). As indicated by respective arrows, the beam turner may be configured to transition the optical excitation path 166 from a direction of propagation parallel to the surface 128 to a direction of propagation normal to the surface 128, and similarly to transition the optical collection path 168 from the normal direction to the parallel direction. Examples of a beam turner include, but are not limited to, a prism, a mirror, or other component that provides an internally or externally reflective surface. As another example, the beam turner may be implemented as bent sections of the optical waveguides 132, 136, in which case the distal portions 156, 158 transition to the bent sections and the bent sections terminate at distal ends facing the fluorescent element 104. It will be understood that the optical excitation path 166 and optical collection path 168 are schematically illustrated as being oriented exclusively in the parallel and normal directions. In practice, however, portions of the optical excitation path 166 and optical collection path 168 may have both parallel and normal directional components. For example, portions of the optical excitation path 166 and optical collection path 168 may curved or bent and may follow more than one turn relative to the parallel or normal direction.

Generally, the fluorescent element 104 is constructed of a material that fluoresces in response to excitation caused by irradiation by incident photons of a given wavelength $\lambda_0$. In advantageous implementations, the fluorescent element 104 has a dual-band composition. That is, at any given temperature of the surface 128, the material(s) of the fluorescent element 104 fluoresces significantly at two different wavelengths $\lambda_1$ and $\lambda_2$ of the electromagnetic spectrum. In this manner, the ratio of two photon-emission intensities may be correlated with surface temperature. Correlating temperature to the ratio is a more reliable approach than correlating temperature to the intensity of a single wavelength because many factors can influence the intensity of the optical signal outputted from the fluorescent element 104. However, most of these effects would influence the intensity from both wavelengths equally, so the ratio is consistent.

Another advantage of the dual-band, ratiometric technique is that all or substantially all of the photons (of both wavelengths $\lambda_1$ and $\lambda_2$) emitted from the fluorescent element 104 may be collected and efficiently transmitted as a single dichromatic optical signal 124 through a single optical collection waveguide 136 to the photodetector 112. There are no losses associated with conventional techniques such as splitting the optical output signal 124 into two paths, employing optical gratings, employing filters, etc. The intensity of the optical signal 124 is preserved as it reaches the photodetector 112 and hence the signal-to-noise ratio remains high.

In conjunction with providing a dual-band fluorescent element 104, the photodetector 112 may include two photosensors 172, 174 such as, for example, two photodiodes. The two photosensors 172, 174 have respective spectral sensitivities (or responsivities) that may be matched to the respective wavelengths $\lambda_1$ and $\lambda_2$ (or range or wavelengths) of the photons emitted by the fluorescent element 104. In other words, the two photosensors 172, 174 may be constructed or selected such that their spectral responsivities are optimized for the respective wavelengths $\lambda_1$ and $\lambda_2$. Alternatively or additionally, the material(s) selected for the fluorescent element 104 may be selected so as to be optimized for the spectral responsivities of the respective photosensors 172, 174. As noted above, the use of a single optical collection waveguide 136 is advantageous, but is not necessary. An example of a photodetector including two photosensors but requiring only a single optical input 124 is described below and illustrated in FIG. 5.

As further shown by example in FIG. 1, the temperature sensor 100 may also include or communicate with signal processing circuitry 180 that receives detector output signal (s) 182, 184 from the photodetector 112. The signal processing circuitry 180 may include any hardware, firmware and software components suitable for correlating the optical response of the fluorescent element 104 to the temperature of the fluorescent element 104 (and thus the temperature of the surface 128 being measured) in accordance with any of the techniques described herein. The temperature sensor 100 may also include or communicate with any suitable component or destination 186 for receiving the temperature data produced by the signal processing circuitry 180. This component or destination 186 may, for example, be a user interface such as a read out device, display device or printer, or a data storage device having an appropriate memory, or some type of control device that makes control decisions based on temperature feedback from the temperature sensor 100, and so on.

In the dual-band configuration, the fluorescent element 104 may include a single fluorophore that emits two wavelengths, $\lambda_1$ and $\lambda_2$, that can be correlated with temperature. One example of such a fluorophore is zinc sulfide doped with trace amounts of copper and/or nickel, such as described by Buck (U.S. Pat. No. 4,885,633). In an alternative configuration, the fluorescent element 104 includes two different fluorophores, i.e. fluorophore(s) of a first type and fluorophore(s) of a second type. In advantageous implementations, the first fluorophore is a stable (temperature-independent or temperature-insensitive) emitter and the second fluorophore is a temperature-dependent (temperature-sensitive) emitter. In other implementations both fluorophores are temperature dependent but have sufficient contrast between their dependence to correlate the ratio to a temperature. In the present context, the term "fluorophore" generally relates to any molecule or compound that exhibits fluorescence, or that includes a component (e.g., a functional group) that causes the molecule or compound to exhibit fluorescence. In response to the incident photon beam utilized for excitation, the first fluorophore will emit photons of wavelength $\lambda_1$ with an output intensity (or efficiency) that does not change significantly over a temperature range of interest. The second fluorophore will emit photons of a wavelength $\lambda_2$ with an output intensity (or efficiency) that varies (typically decreases) as temperature increases. As an example, the first fluorophore may be a stable blue emitter and the second fluorophore may be a temperature-variable emitter of longer wavelengths (e.g., red or near infrared). The term "temperature insensitive" encompasses "substantially" or "predominantly" temperature insensitive, in that for the temperature range expected for the temperature sensor 100, a fluorophore that fluoresces with an output that changes substantially less than the second fluorophore, or increases with an increase in temperature while the second fluorophore decreases, is considered herein to be a stable emitter.

The first and second fluorophores may be provided in any suitable form. In some implementations, the fluorescent element 104 is or includes a combination (mixture, blend, etc.) of first and second fluorescent dyes. As noted above, the first and second dyes may be selected so as to be optimized for the spectral responsivities of the respective photosensors 172, 174, or vice versa. In this manner, the peak intensities emitted by the two dyes are easily distinguishable by the photodetector 112. Also, the second dye may be selected so as to be highly temperature sensitive so as to maximize the sensitivity of the temperature sensor 100 as a temperature measuring device. As an example, the second dye may exhibit a temperature sensitivity in a range from about 0.2%/° C. to about 5%/° C., where the percentage (%) is the change in photoluminescent (PL) intensity in any arbitrary unit. In a more specific yet non-limiting example, the temperature sensitivity of the second dye is about 2%/° C. As a non-limiting example of a dye combination that meets the foregoing criteria, the first dye may be a stable blue emitter such as $BaMgAl_{10}O_{17}$:$Eu^{2+}$ (BAM:Eu) and the second dye may be a temperature-variable red emitter such as ruthenium(II) tris(2,2'-bipyridyl), or $Ru(bpy)_3^{2+}$. As a second example of a dye combination that meets the foregoing criteria, the first dye may be a stable red emitter such as $Gd_2O_2S$:Eu and the second dye may be a temperature-variable blue emitter such as ZnS:Ag. As a third example of a dye combination that meets the foregoing criteria, the first dye may be a stable blue emitter such as BAM:Eu and the second dye may be a temperature-variable red emitter such as europium(III) thenoyl-trifuoroacetonate (TTA), or a related Eu chelate. More generally, compounds with emission arising from Eu may often be utilized as a stable fluorophore, and ZnS when utilized as a temperature-sensitive fluorophore may include a dopant such as, for example, copper (Cu), nickel (Ni) and/or silver (Ag). Based on the teachings being provided in the present disclosure, other dyes (or other types of fluorophores) that may serve as suitable substitutes for BAM:Eu, $Ru(bpy)_3^{2-}$ and other examples just given, and may become apparent to persons of ordinary skill in the art, and all such substitutes are encompassed by the present disclosure.

The first and second dyes may be supported by (included in) a matrix material of any type that does not impair optical transmission. The matrix material may be selected so as to enable the fluorescent element 104 to be formed or applied as a thin layer in a simple and low-cost process, such as by applying the matrix and dye combination using a solution-based process, spin coating, dip coating, spray coating, etc. The matrix material may also be selected (or additional components may be added) to improve some property or characteristic of the first dye and/or second dye. For instance, the matrix material may be one that reduces the oxygen partial pressure sensitivity of a dye. Various polymer matrices may be suitable. In one non-limiting example, the polymer matrix is polyvinyl alcohol (PVA), which reduces the oxygen partial pressure sensitivity of $Ru(bpy)_3^{2+}$ and meets the other criteria just specified.

Figure 2:
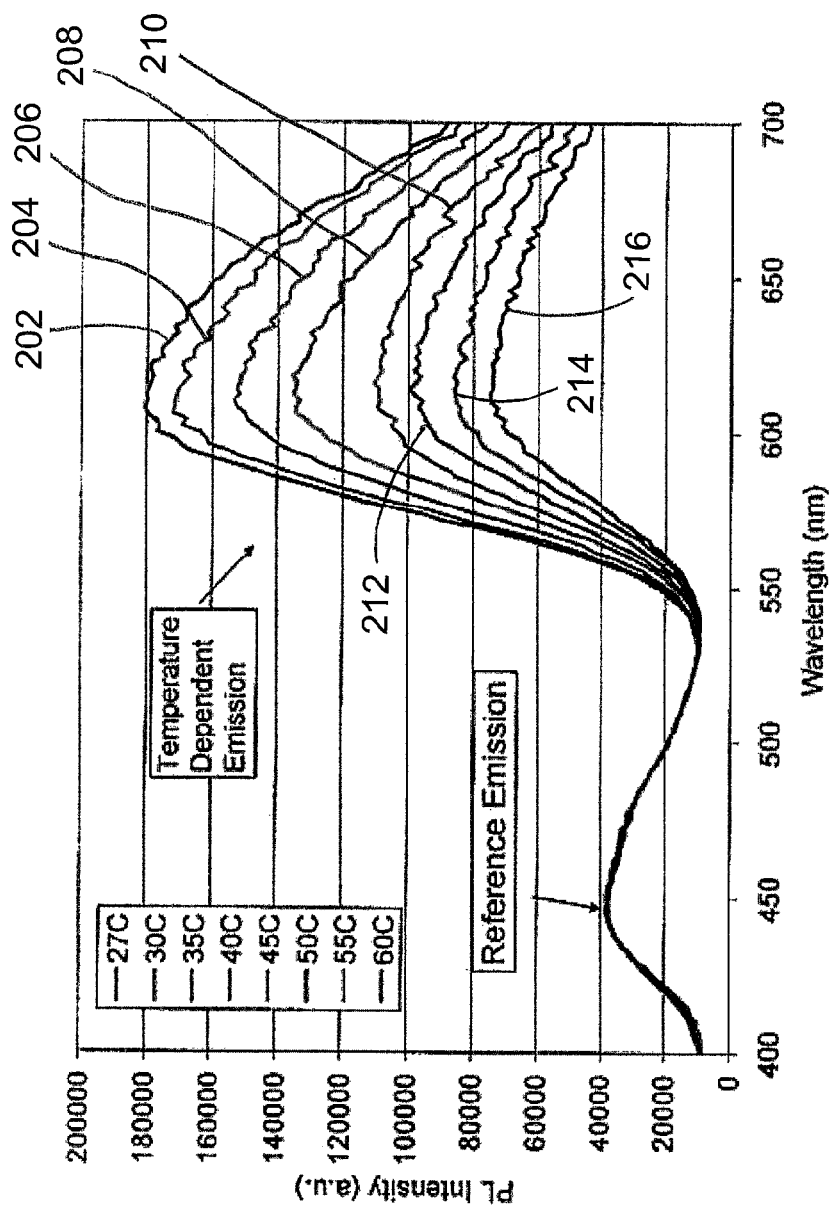
FIG. 2 is a set of PL emission spectra (intensity as a function of wavelength) for a BAM:Eu/Ru(bpy)$_3^{2+}$ dye blend at different temperatures.
Figure 3:
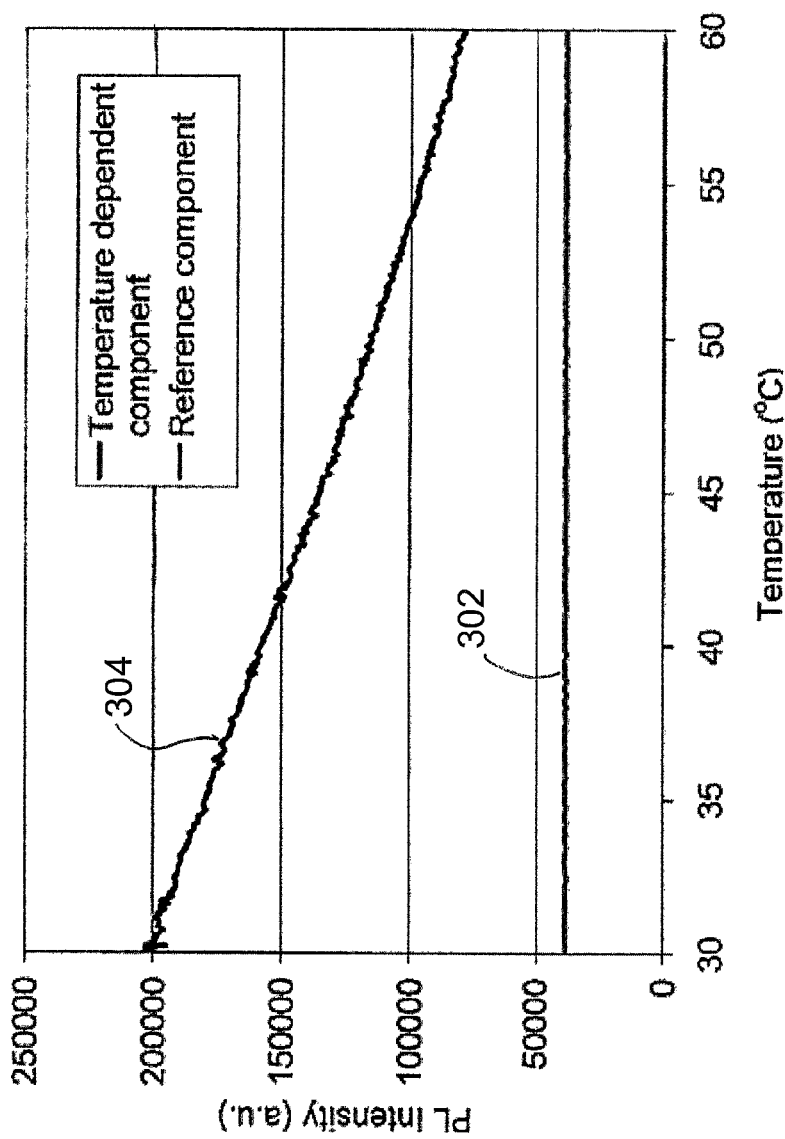
FIG. 3 is a plot of the peak PL intensity for BAM:Eu and Ru(bpy)$_3^{2-}$ as a function of temperature, showing the temperature dependence of the respective maxima.

FIG. 2 is a set of PL emission spectra (intensity as a function of wavelength) for a BAM:Eu/$Ru(bpy)_3^{2+}$ dye blend at different temperatures. Specifically, the curves correspond to temperatures as follows: curve 202 at 27° C., curve 204 at 30° C., curve 206 at 35° C., curve 208 at 40° C., curve 210 at 45° C., curve 212 at 50° C., curve 214 at 55° C., and curve 216 at 60° C. The stable 450-nm blue emission is from the BAM:Eu, while the temperature-dependent 620-nm emission is from the $Ru(bpy)_3^{2+}$. FIG. 3 is a plot of the PL intensity for BAM:Eu and $Ru(bpy)_3^{2+}$ as a function of temperature, showing the temperature dependence of the respective maxima. Again, the stable emission (curve 302) is from the BAM:Eu while the temperature-dependent emission (curve 304) is from the $Ru(bpy)_3^{2+}$.

Figure 4:
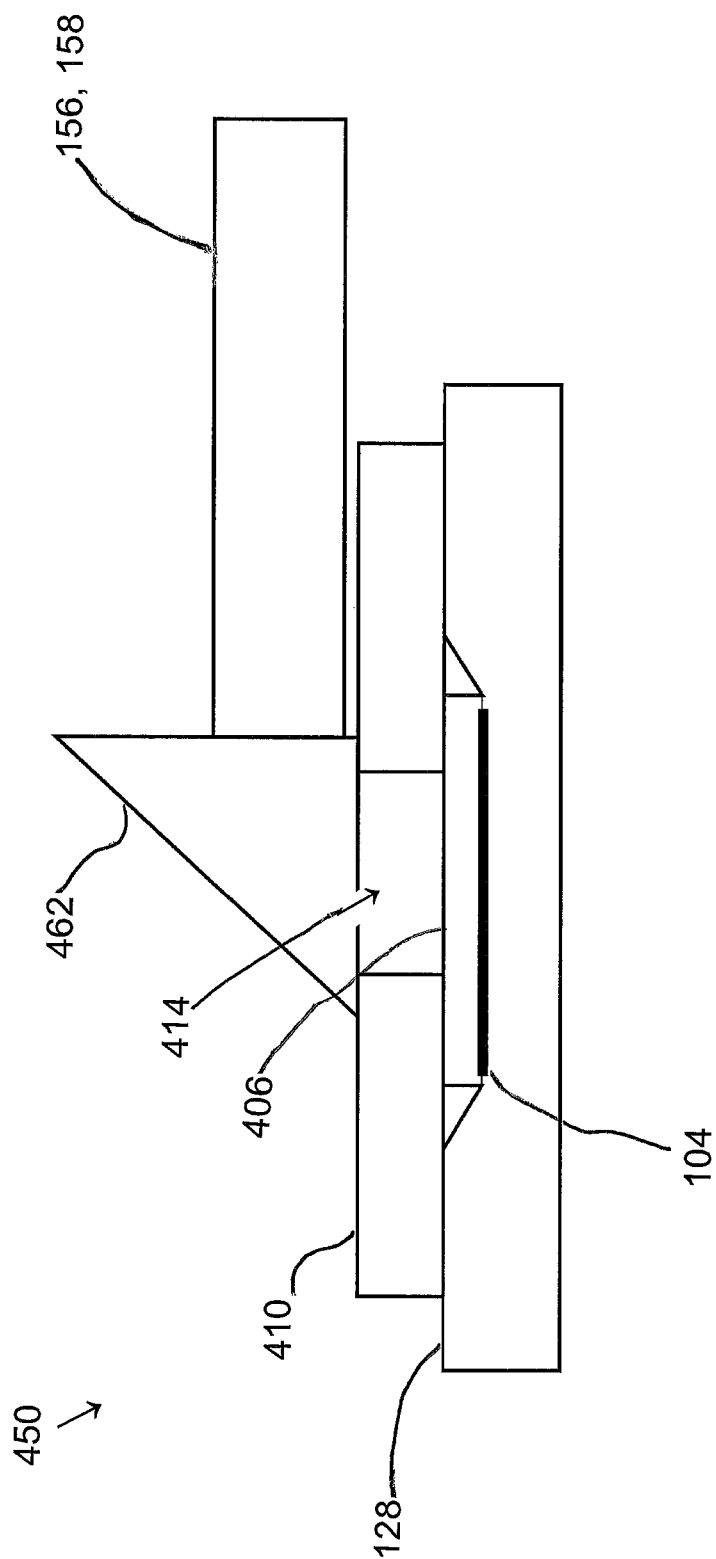
FIG. 4 is a cross-sectional view of an example of a temperature measurement probe that may be provided with a temperature sensor such as illustrated in FIG. 1.

FIG. 4 is a cross-sectional view of an example of a temperature measurement probe 450 that may be provided with the temperature sensor 100. The probe 450 has a low-profile configuration as described above in which the distal portions 156, 158 of the optical excitation and collection waveguides are parallel with the surface 128 of interest for a least some distance from the probe 450 toward the active components of the temperature sensor 100. In this example the distal ends 156, 158 of the optical waveguides are arranged in a manner to improve the light collection efficiency. A single excitation fiber 132 is surrounded by a bundle of six collection fibers 136 (FIG. 1). In this example, the distal ends 156, 158 of the optical waveguides terminate at a prism 462 having a geometry and material composition configured to turn the respective optical paths utilized for excitation and collection a resultant ninety degrees via prism surfaces causing total internal reflection. The distal ends 156, 158 of the optical waveguides may be coupled to the prism 462 in any manner suitable for efficiently coupling excitation and emission signals between these components. As one example, an optically transmissive adhesive may be utilized. The prism 462 may have any transparent composition suitable for this purpose, one non-limiting example being fused silica, and other examples that include optical glass such as BK7, or optical polymers such as polystyrene or polycarbonate. In the present context, the term "transparent" refers to the efficient transmission of optical signals at the wavelengths contemplated for a given application. The term "efficient" generally means transmission without appreciable losses, i.e., in a manner that results in acceptable performance of the photodetector 112 (high intensities received and high S/N ratio). The outer surfaces of the prism 462 may be coated or treated so as to protect the prism 462 from, or ensure its operation in, a harsh environment. For example, the prism 462 may be metalized to increase reflectivity, or may be uncoated to allow operation in a high microwave or magnetic field environment. The prism 462 is interposed between the optical waveguide distal portions 156, 158 and the fluorescent element 104. More generally, any suitable optical beam turner may be provided, such as the illustrated prism 462, or a reflective surface, or a pair of bent distal ends of the respective distal portions of the optical fibers 156, 158, etc.

The fluorescent element 104 in this example is provided in the form of a layer of fluorescent material according to any of the examples given herein (e.g., a dye blend in a polymer matrix). In the present example, the probe 450 includes a transparent substrate 406 (e.g., a transparent polymer, glass or crystal) on which the fluorescent element 104 is disposed. The fluorescent element 104 may be applied or deposited on the transparent substrate 406 as a coating or film. The fluorescent element 104 may be disposed on an outer side of the transparent substrate 406 (opposite to the prism 462) and placed in direct contact with the structural surface 128 of interest. The transparent substrate 406 is thus interposed between the fluorescent element 104 and the prism 462. If desired or necessary, an encapsulation layer (not separately shown) of any suitable, thermally conductive composition may cover the exposed side of the fluorescent element 104 to protect the dye(s).

Also in this example, the probe 450 includes a layer or block 410 interposed between the fluorescent element 104 (and associated substrate 406, if any) and the distal portions 156, 158 of the optical waveguides (and, more specific to the present example, between the fluorescent element 104 and the prism 462). A through-hole or aperture 414 is formed through the thickness of the layer 410 at a location that defines a field of view centered on the fluorescent element 104. The gap between the prism 462 and the fluorescent element 104 (or between the prism 462 and the associated substrate 406, if present) that is formed by the aperture 414 provides a particular advantage for rapid response of the temperature sensor 100. The gap helps to thermally insulate the fluorescent element 104, which can be very thin, for example 10-200 μm in thickness, from the bulkier components that either provide mechanical support (in this case the layer 410) or optical function such as the prism 462. The layer 410 may be composed of any suitable rigid or flexible material, which in some implementations is an opaque material. In one non-limiting example, the opaque material is Rogers Duroid® circuit board material readily available from various suppliers. The layer 410 may be useful for isolating the fluorescent element 104 from the ambient operating environment and/or provide a supporting structure for the probe 450. In the present example, the fluorescent-coated substrate 406 and the prism 462 are mounted in any suitable manner to opposite sides of the layer 410 such that the positions of these components are fixed with respect to each other. As illustrated in FIG. 4, the structure of the surface 128 of interest may be deformable in which case application of the probe 450 to the surface 128 encapsulates the fluorescent element 104 in the resulting depression in the surface 128. In the case of a rigid surface, the layer 410 may be flexible and deform to create contact with the surface 128. If needed for encapsulation or isolation, the layer 410 may extend along the lateral sides (in the thickness direction) of the fluorescent element 104, or alternatively a separate encapsulant may be added to the lateral sides.

In an alternative embodiment, the fluorescent element 104 may be formed directly on the surface 128 of interest such as by a coating or spraying technique. The substrate 406 or other suitable portion of the temperature measurement probe 450 is then brought into contact with the fluorescent element 104 and may be fixed in position by any suitable means.

Figure 5:
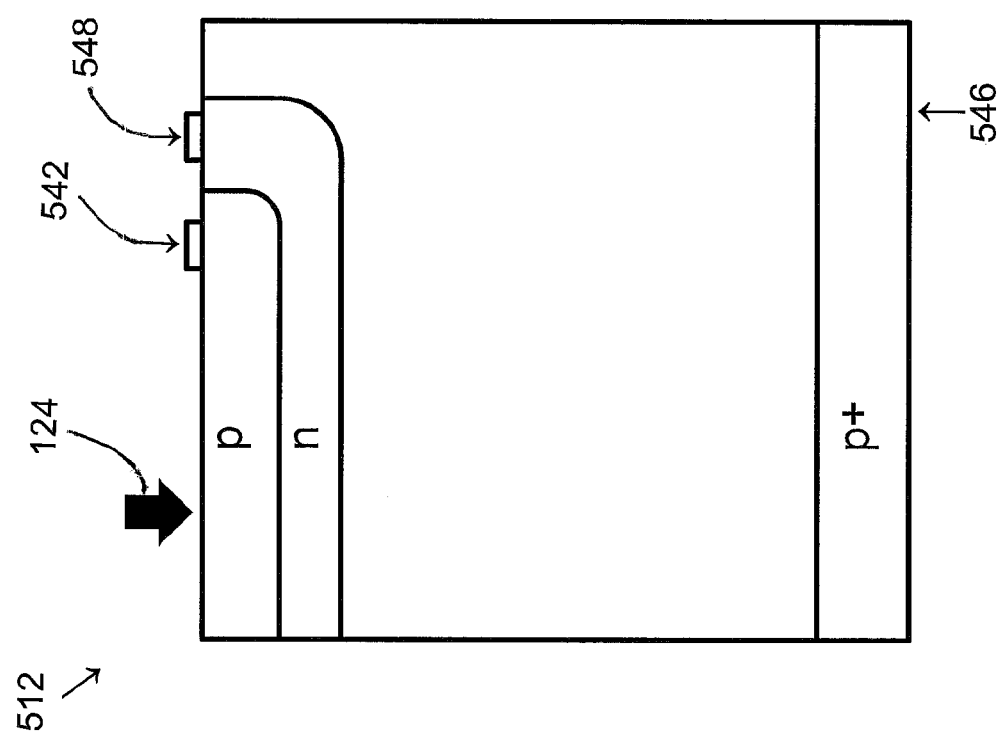
FIG. 5 is a cross-sectional elevation view of an example of a photodetector that may utilized with a temperature sensor such as illustrated in FIG. 1.
Figure 6:
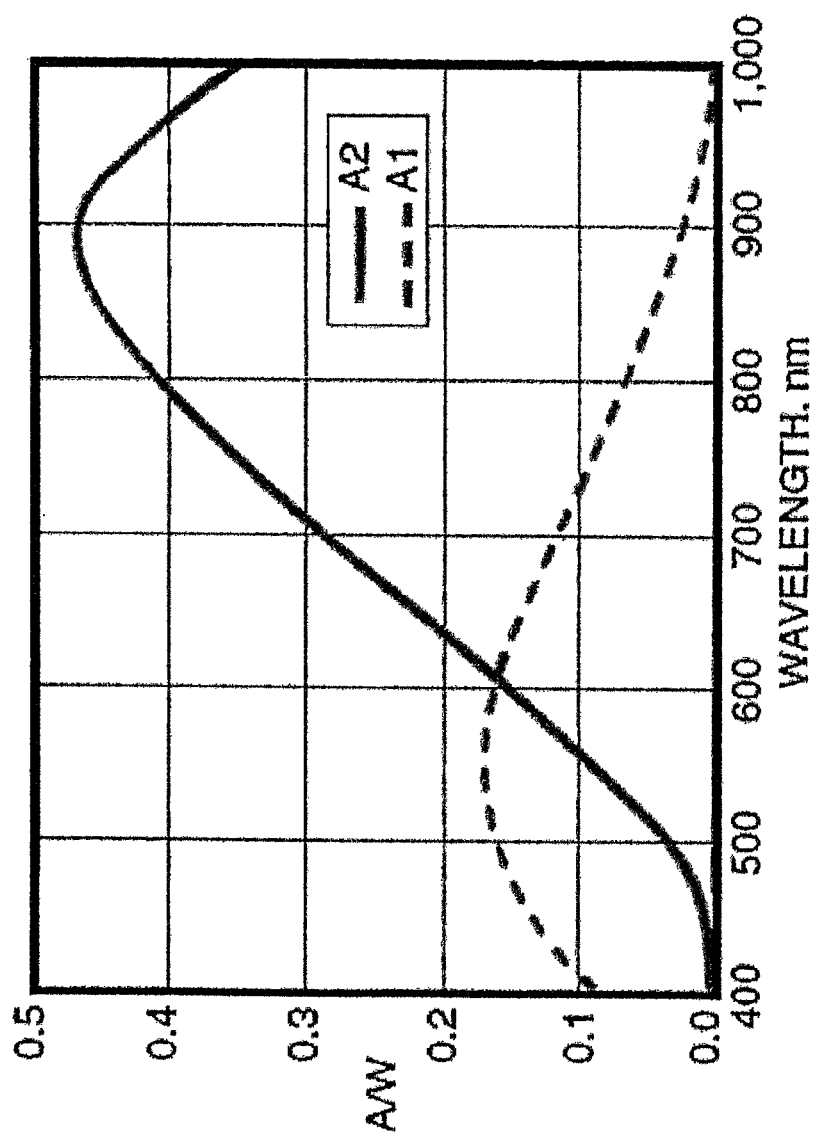
FIG. 6 is a plot of the two different spectral sensitivities (amperes per watts) of the two vertically stacked photodiodes (A1 and A2).

FIG. 5 is a cross-sectional elevation view of an example of a photodetector 512 that may utilized with the temperature sensor 100 illustrated in FIG. 1, particularly in conjunction with the use of a dual-band fluorescent element 104. In this example, the photodetector 512 is constructed as a monolithic dual-diode device in which two photodiodes (p-n junctions) are vertically integrated (disposed in a vertically integrated arrangement) on a common silicon substrate. The dual-diode photodetector 512 includes two anodes 542, 546 and a common cathode 548. The varying optical penetration depth as between the two photodiodes results in different spectral sensitivities for the two photodiodes. An example of this is shown in FIG. 6, which is a plot of the two different spectral sensitivities (amperes per watt) of the two vertically stacked photodiodes (A1 and A2). The different spectral sensitivities allow the two photodiodes to distinguish between the respective responses of two different fluorophores without the use of filters or spatial separation of wavelengths, thereby increasing signal collection efficiency. The dual-diode photodetector 512 requires only a single optical signal input 124, i.e. the beam of photons ($\lambda_1 + \lambda_2$) emitted by the first and second dyes and transmitted by the single optical collection waveguide 136 (FIG. 1). This single waveguide 136, such as an optical fiber or bundle of fibers, may be closely coupled to the photodetector 512 whereby virtually all photons are utilized to produce electrical output signals (i.e., photodetector output signals, or photodetector signal outputs). In response to this optical signal input 124, the dual-diode photodetector 512 generates two photocurrents that may be outputted as respective detector output signals (photodetector output signals) 182, 184 (FIG. 1). In accordance with the present teachings, the ratio of these two detector output signals 182, 184 is considered in determining the surface temperature being measured. As the spectral intensity of the incident optical signal input 124 changes, the detector output signal ratio also changes and may be correlated with the temperature changes that cause the spectral shifts. One of the p-n junctions may be configured (material compositions, thicknesses, dopants, etc.) for maximum sensitivity to the stable photon wavelength emitted by the first dye, while the other p-n junction may be configured for maximum sensitivity to the temperature-dependent photon wavelengths emitted by the second dye. In one example, the dual-diode photodetector 512 may be based on a commercial wavelength sensor available from Pacific Silicon Sensor, Inc., Westlake Village, Calif., and designated WS-7.56-TO5, from which FIGS. 5 and 6 are based.

Figure 7:
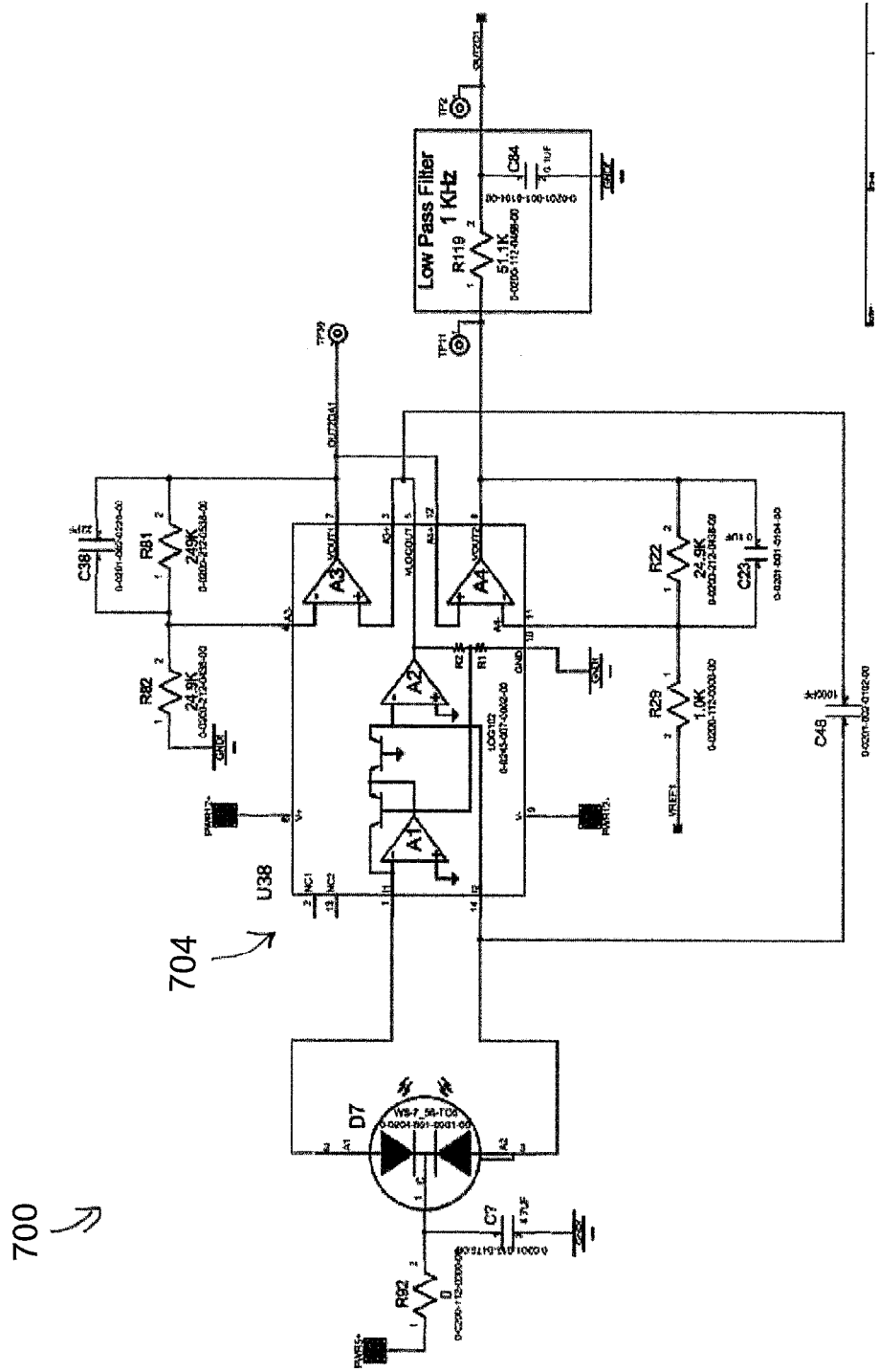
FIG. 7 is a schematic view of an example of a signal processing circuit that may be provided in a temperature sensor according to an implementation of the present disclosure.

The signal processing circuit 180 (FIG. 1) receiving the detector output signals (photodetector output signals) 182, 184 may be configured in any manner appropriate for conditioning the signals 182, 184, effecting the proper correlations, and generating temperature data interpretable by a user (or by an instrument employing temperature feedback). As an example, the signal processing circuit 180 may include a comparator circuit in which the two detector output signals 182, 184 are boosted by respective linear or logarithmic transimpedance amplifiers and then fed to the inverting and non-inverting inputs of an operational amplifier functioning as a comparator. The comparator outputs a single voltage signal that is proportional to the detector output signal ratio. FIG. 7 shows a second example of a signal processing circuit 700 that includes a logarithmic amplifier 704 that produces a voltage output that is approximately proportional to the ratio of input signals from the first and second photosensors.

Figure 8:
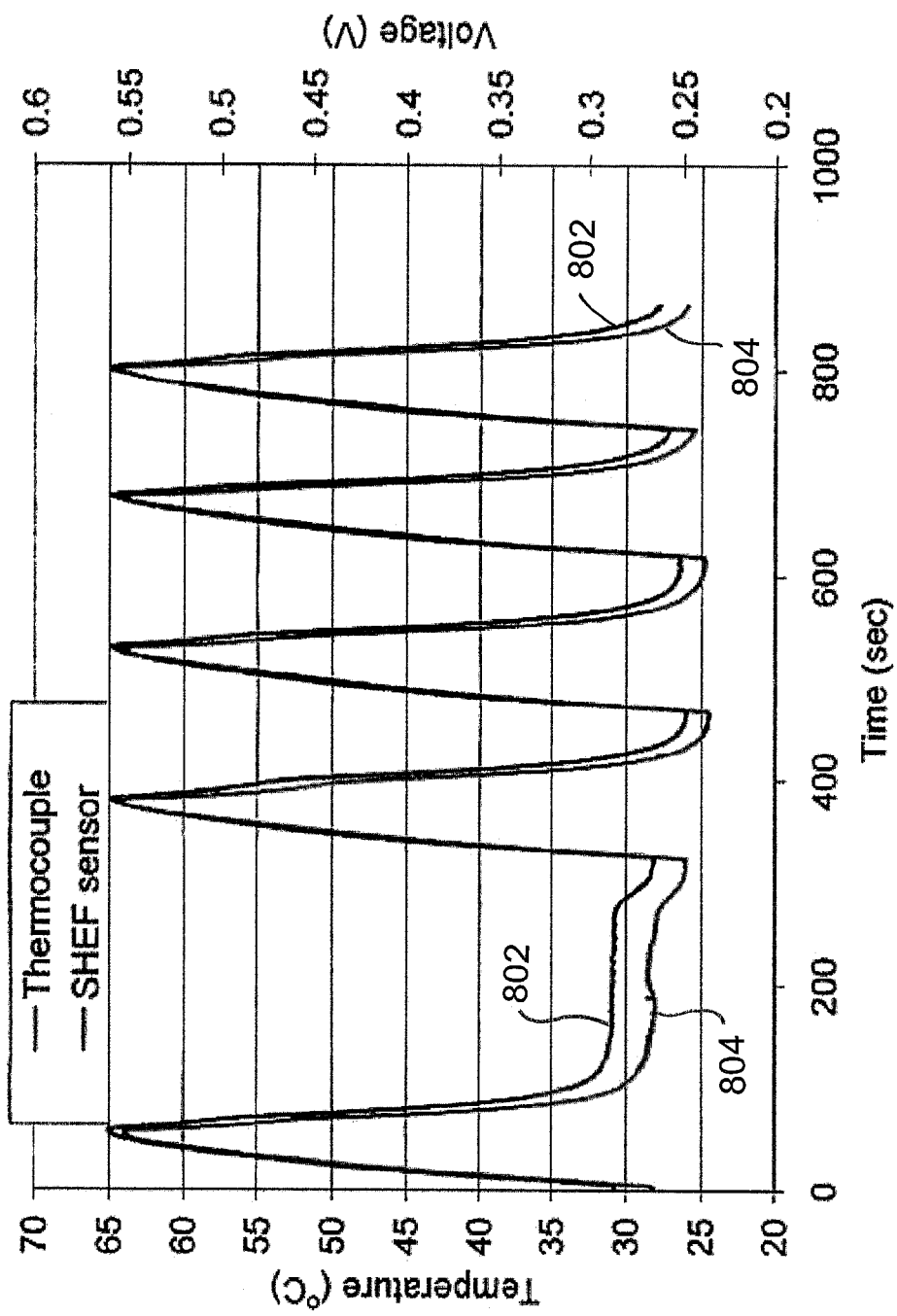
FIG. 8 is a set of plots showing the output voltage of an example of a temperature sensor constructed according to the present disclosure, as temperature was varied over time, in comparison to a reference temperature signal produced by a thermocouple.

In one example, a temperature sensor was constructed in accordance with the present disclosure and tested. An LED that emits at a wavelength of 365 nm was utilized as the excitation source. FIG. 4 is representative of the probe structure utilized. The fluorescent element was a layer of BAM: Eu/Ru(bpy)$_3^{2+}$ dye blend in a PVA matrix, which was coated on a polymer substrate as described above. A 500 nm layer of parylene was deposited onto the dye layer to help protect it from chemical or mechanical degradation. FIG. 5 is representative of the dual-diode photodetector utilized. Optical fibers were utilized as waveguides for transmitting the excitation signal from the LED to the fluorescent element and measurement signal from the fluorescent element to the dual-diode photodetector. FIG. 8 is a set of plots showing the sensor output voltage as temperature was varied over time (curve 802), in comparison to a reference temperature signal produced by a thermocouple (curve 804). FIG. 8 demonstrates the resolution and repeatability of the temperature sensor. The temperature sensor may be configured to exhibit an accuracy of ±1° C. or lower. Another advantage is the low output noise made possible by the efficiency of the temperature sensor. The output noise, to one standard deviation, was found to be about 0.15° C., which is comparable to decay time-based sensors and much better than techniques utilizing other fluorescence thermometry approaches, or dual-band ratios that do not incorporate aspects of the present invention. Another advantage is the fast response time and rapid heating rates that are measurable, made possible by the sensor design and the dual-band technique. Response time was found to be 0.1 sec and heating rates as high as 35° C./sec were accurately reproduced, which are better than comparable decay time-based sensors.

Various implementations of the temperature sensor disclosed herein may be utilized for measuring surface temperature in a wide variety of applications, particularly applications requiring high accuracy and applications for which measurement occurs in an adverse environment. In one example, the temperature sensor may be utilized to measure external skin temperature. In another example, the temperature sensor may be utilized as an MRI-compatible diagnostic sensor or in other environments involving high magnetic and RF fields. In another example, the temperature sensor may be utilized as a compact catheter-based sensor.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A temperature sensor, comprising:
    a photon source;
    a fluorescent element communicating with the photon source and comprising a first fluorophore and a second fluorophore, wherein the first fluorophore is substantially temperature insensitive and the second fluorophore is temperature sensitive, and the first fluorophore and the second fluorophore are configured for emitting respective optical signal outputs in response to receiving an incident optical signal input from the photon source;
    a photodetector communicating with the fluorescent element and comprising a first photosensor and a second photosensor disposed in a vertically integrated arrangement, the first photosensor exhibiting a first spectral responsivity and the second photosensor exhibiting a second spectral responsivity, wherein the photodetector is configured to receive a single incident optical input from the fluorescent element comprising the respective optical signal outputs and, in response, produce a first photodetector signal output and a second photodetector signal output; and
    signal processing circuitry configured for correlating the first photodetector signal output and the second photodetector signal output with the temperature of the fluorescent element, wherein the first photodetector signal output and the second photodetector signal output are dependent on a ratio of two intensities of respective photons emitted by the first fluorophore and the second fluorophore.

2. The temperature sensor of claim 1, comprising an optical excitation waveguide providing an optical excitation path from the photon source to the fluorescent element, and an optical collection waveguide providing an optical collection path from the fluorescent element to the photodetector, wherein the photon source and the photodetector are remotely situated from the fluorescent element.

3. The temperature sensor of claim 2, wherein the optical excitation waveguide and the optical collection waveguide comprise respective distal portions communicating with the fluorescent element, and the distal portions are parallel to the fluorescent element.

4. The temperature sensor of claim 3, comprising an optical beam turner interposed between the fluorescent element and the distal portions, the optical beam turner configured for transitioning an optical excitation path from the optical excitation waveguide from being parallel to the fluorescent element to being normal to the fluorescent element, and for transitioning an optical collection path into the optical collection waveguide from being normal to the fluorescent element to being parallel to the fluorescent element.

5. The temperature sensor of claim 4, wherein the optical beam turner is selected from the group consisting of a prism, a reflective surface, and a pair of bent distal ends of the respective distal portions.

6. The temperature sensor of claim 2, comprising a layer interposed between the fluorescent element and respective distal ends of the optical excitation waveguide and the optical collection waveguide, the layer having an aperture defining a field of view of the fluorescent element.

7. The temperature sensor of claim 1, wherein the fluorescent element comprises a polymer matrix in which the first fluorophore and the second fluorophore are located.

8. The temperature sensor of claim 7, wherein the first fluorophore comprises a stable blue emitter dye and the second fluorophore comprises ruthenium(II) tris(2,2'-bipyridyl).

9. The temperature sensor of claim 8, wherein the stable blue emitter dye is $BaMgAl_{10}O_{17}:Eu^{2+}$.

10. The temperature sensor of claim 8, wherein the polymer matrix has a composition selected to reduce an oxygen partial pressure sensitivity of the ruthenium(II) tris(2,2'-bipyridyl).

11. The temperature sensor of claim 1, comprising a transparent substrate on which the fluorescent element is disposed.

12. The temperature sensor of claim 1, wherein the first fluorophore is selected to optimize the first spectral responsivity and the second fluorophore is selected to optimize the second spectral responsivity.

13. The temperature sensor of claim 1, wherein the first fluorophore is a blue emitter and the second fluorophore is a red emitter.

14. The temperature sensor of claim 13, wherein the first fluorophore is $BaMgAl_{10}O_{17}:Eu^{2+}$.

15. The temperature sensor of claim 13, wherein the second fluorophore is selected from the group consisting of ruthenium(II) tris(2,2'-bipyridyl), a Eu chelate, and a combination of ruthenium(II) tris(2,2'-bipyridyl) and a Eu chelate.

16. The temperature sensor of claim 1, wherein the first fluorophore is a red emitter and the second fluorophore is a blue emitter.

17. The temperature sensor of claim 13, wherein the first fluorophore is $Gd_2O_2S:Eu$.

18. The temperature sensor of claim 16, wherein the second fluorophore is ZnS doped with a dopant selected from the group consisting of copper, nickel, silver, and combinations of two or more of the foregoing.

19. The temperature sensor of claim 1, wherein the second fluorophore has a temperature sensitivity ranging from about 0.2 to 5%/° C., where the percentage represents a change in photoluminescent intensity.

20. The temperature sensor of claim 1, wherein the second fluorophore has a temperature sensitivity of about 2%/° C., where the percentage represents a change in photoluminescent intensity.

21. The temperature sensor of claim 1, wherein the first photosensor is configured to absorb a first spectral portion of the optical input to produce the first electrical detector signal output, and the second photosensor is configured to absorb a spectral portion of the optical input that passes through the first photosensor to produce the second electrical detector signal output.

22. A method for measuring a temperature of a surface, the method comprising:
    irradiating a fluorescent element adjacent to the surface with a photon beam, the fluorescent element comprising a first fluorophore that is substantially temperature insensitive and a second fluorophore that is temperature sensitive;
    collecting first photons emitted from the first fluorophore and second photons emitted from the second fluorophore, wherein the first photons have a first wavelength, and the second photons have a second wavelength different from the first wavelength and an intensity dependent on the temperature of the surface;
    transmitting the first photons and the second photons as a single dichromatic beam to a photodetector, the photodetector comprising a first photosensor and a second photosensor disposed in a vertically integrated arrangement and having different respective spectral responsivities, such that the first photosensor and the second photosensor respectively generate a first photodetector signal output and a different second photodetector signal output in response to transmitting the single dichromatic beam; and
    correlating a ratio of the two output signals to the temperature of the surface.

23. The method of claim 22, further comprising applying the fluorescent element to the surface as a coating.

24. The method of claim 22, further comprising applying the fluorescent element to a transparent substrate as a coating, and placing the coated substrate in contact with the surface.

25. The method of claim 22, wherein irradiating comprises placing an optical excitation waveguide in optical communication with the fluorescent element, and collecting comprises placing an optical collection waveguide in optical communication with the fluorescent element, and the optical excitation waveguide and the optical collection waveguide are placed such that respective distal portions of the optical excitation waveguide and the optical collection waveguide near the fluorescent element are parallel with the surface.

26. The method of claim 22, wherein the first photodetector signal output is produced in response to the first photosensor absorbing first photons, and the second photodetector signal output is produced in response to the second photosensor absorbing second photons that have passed through the first photosensor.

27. A temperature measurement probe, comprising:
    a fluorescent element comprising a first fluorophore and a second fluorophore, wherein the first fluorophore is substantially temperature insensitive and the second fluorophore is temperature sensitive;
    an enclosure;
    an optical beam turner communicating with the fluorescent element and disposed in the enclosure;
    an optical excitation waveguide comprising a first distal portion communicating with the optical beam turner, the first distal portion oriented along a direction parallel with the fluorescent element; and
    an optical collection waveguide comprising a second distal portion communicating with the optical beam turner, the second distal portion oriented along the direction parallel with the fluorescent element, wherein:
    the temperature measurement probe provides an optical excitation path and an optical collection path;
    the optical excitation path runs through the optical excitation waveguide along the parallel direction, through the optical beam turner in which the optical excitation is path is turned to a direction normal to the fluorescent element, and to the fluorescent element along the normal direction; and the optical collection path runs from the fluorescent element along the normal direction, through the optical beam turner in which the optical collection path is turned to the parallel direction, and through the optical collection waveguide along the parallel direction.

28. The temperature measurement probe of claim 27, comprising a transparent substrate, wherein the fluorescent element is disposed on a side of the transparent substrate opposite to the optical beam turner.

29. The temperature measurement probe of claim 28, wherein the fluorescent element is disposed on the transparent substrate as a coating.

30. The temperature measurement probe of claim 27, wherein the optical beam turner is selected from the group consisting of a prism, a reflective surface, and both of the foregoing.

31. The temperature measurement probe of claim 28, comprising a layer of material between the optical beam turner and the transparent substrate, the layer comprising an aperture defining a field of view between the optical beam turner and the fluorescent element.

32. The temperature measurement probe of claim 27, comprising a layer of material between the optical beam turner and the fluorescent element, the layer comprising an aperture defining a field of view between the optical beam turner and the fluorescent element.

33. The temperature measurement probe of claim 32, wherein the layer of material is deformable.

34. The temperature measurement probe of claim 32, wherein the layer of material encapsulates the fluorescent element.

\* \* \* \* \*